United States Patent [19]

Standlick

[11] Patent Number: 4,901,888
[45] Date of Patent: Feb. 20, 1990

[54] MULTIPLE COMPONENTS FLOW GUN

[75] Inventor: Ronald E. Standlick, Rochester, Mich.

[73] Assignee: Jesco Products Company, Inc., Sterling Heights, Mich.

[21] Appl. No.: 817,152

[22] Filed: Jan. 6, 1986

Related U.S. Application Data

[60] Continuation of Ser. No. 748,707, Jun. 25, 1985, abandoned, which is a division of Ser. No. 411,902, Aug. 26, 1982, abandoned.

[51] Int. Cl.$^4$ .............................................. B67D 5/60
[52] U.S. Cl. .................................. 222/145; 222/148; 222/482; 222/23
[58] Field of Search ............... 222/129, 132, 135, 145, 222/251, 252, 394, 478, 481–484, 544–545, 559, 644, 510, 148

[56] References Cited

U.S. PATENT DOCUMENTS

| | | | |
|---|---|---|---|
| 3,179,341 | 4/1965 | Plos et al. ........................... | 239/307 |
| 3,541,023 | 11/1970 | Cole, III ............................. | 222/135 |
| 3,589,560 | 6/1971 | Wilcox ................................ | 222/559 |
| 3,633,795 | 1/1972 | Brooks ............................... | 222/135 |
| 4,003,501 | 1/1977 | Ramazzotti et al. ................ | 222/145 |
| 4,083,474 | 4/1978 | Waite et al. ........................ | 222/145 |
| 4,169,545 | 10/1979 | Decker ............................... | 222/145 |
| 4,285,446 | 8/1981 | Rapp et al. ......................... | 222/148 |
| 4,331,262 | 5/1982 | Snyder et al. ...................... | 222/644 |
| 4,399,930 | 8/1983 | Harding ............................. | 222/145 |

Primary Examiner—Joseph J. Rolla
Attorney, Agent, or Firm—Dykema Gossett

[57] ABSTRACT

A device is disclosed for receiving fluid components from a proportioning device and delivering the components to a mixing tube for chemical reaction of the components. The device comprises a housing having two inlet chambers and an outlet chamber. One of the fluids is connected to the first inlet chamber while the other fluid is connected to the second inlet chamber and both inlet chambers are fluidly connected to the outlet chamber by separate fluid passageways. A valve assembly is operable to simultaneously open both fluid passageways so that the fluids from the inlet chambers flow into the outlet chamber and then out from the device housing to the mixing tube. The device housing comprises two housing parts which are detachably secured together and, when separated, provide open access to the valve members and outlet chamber for cleaning and to enable a ratio check to be performed at a point in the system close to the mixing tube.

7 Claims, 2 Drawing Sheets

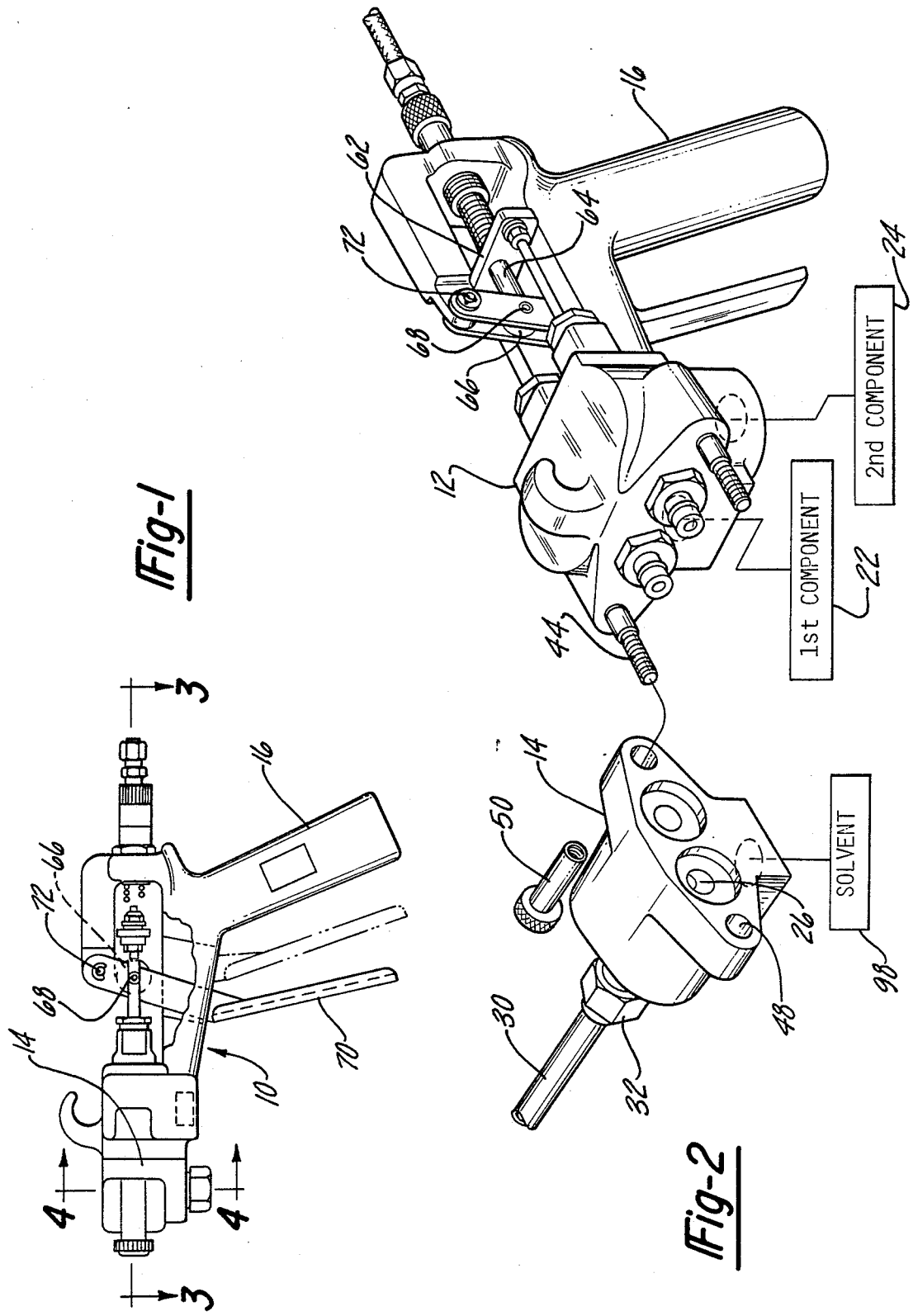

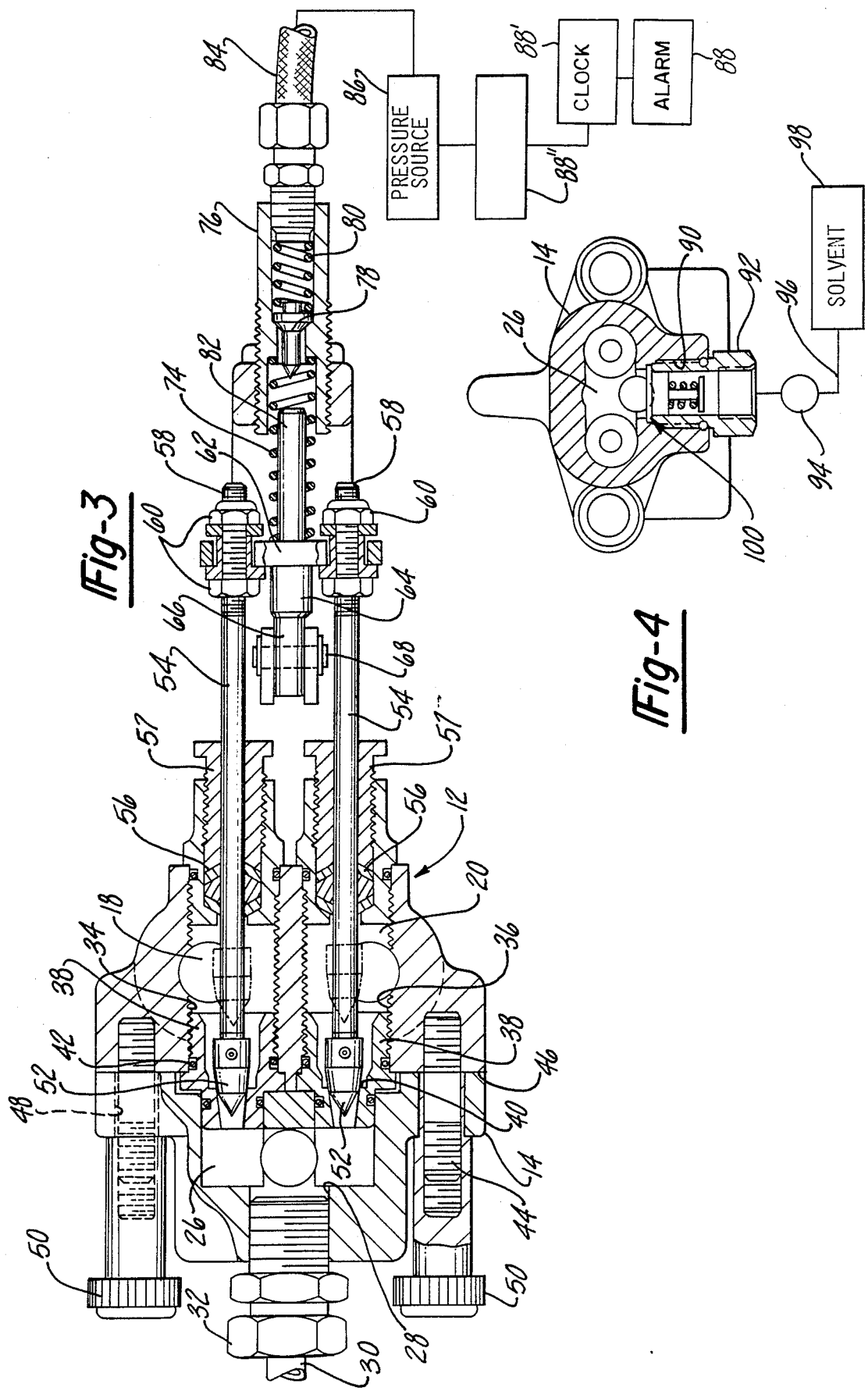

MULTIPLE COMPONENTS FLOW GUN

This is a continuation of co-pending application Ser. No. 748,707, filed on June 25, 1985, now abandoned, which was a divisional of U.S. Ser. No. 411,902, filed on Aug. 26, 1982, now abandoned.

BACKGROUND OF THE INVENTION

I. Field of the Invention

The present invention relates to a system for mixing and dispensing two or more fluids such as glue components and more particularly, to a gun for such a system for receiving at least two fluids from a proportioning device and delivering the fluids to a mixing and dispensing tube so that the mixed substances can be deposited at the point of use.

II. Description of the Prior Art

In certain types of adhesives, commonly known as epoxy adhesives, two fluid components are intermixed to form the adhesive before the adhesive is applied to the desired surface. Such adhesives form a very strong bond once the fluids or glue components are mixed together and are often used in industrial applications.

It is very difficult, if not altogether impossible, to clean the internal chambers and passageways of the previously known adhesive dispensers. This is particularly critical for adhesive dispensers since the adhesive can harden and render the dispenser inoperable and useless.

There are other applications where chemically reacted materials are used such as in the use of silicones and polyurethanes where it is necessary to mix two or more substances before dispensing the mixed material at the point of use. Again, the ability to clean the equipment used to dispense such materials is very important.

Presently available systems include a proportioning means for providing the components in the proper proportions and a mixing and dispensing tube for delivering the mixed, chemically reacted components to the point of use. Such systems have heretofore not included a convenient means for accurately checking the proportions of the components being delivered to the mixing tube. This is important to insure a properly reacted final product.

SUMMARY OF THE PRESENT INVENTION

The present invention provides a system for mixing and dispensing two or more fluids, such as adhesive components, which overcomes all of the above disadvantages of the previously-known devices.

In brief, the system of the present invention includes a multiple component flow gun connected intermediate the proportioning device and the mixing means. The gun comprises a housing having two inlet chambers and an outlet chamber. A first fluid from the proportioning means, such as a first adhesive component, is fluidly connected to one inlet chamber while a second fluid from the proportioning means such as a second adhesive component which will chemically react with the first component to produce an adhesive, is connected to the other chamber. In addition, a pair of passageways fluidly connect in the inlet chambers with the outlet chamber while an outlet passageway in the housing connects with a mixing device such as a static type mixing tube.

A valve member is operatively disposed in each passageway between the inlet and outlet chambers and the valve members are simultaneously movable between an open and closed position. In their closed position, the valve members prevent fluid flow from the inlet chambers to the outlet chamber. Conversely, in their open position, fluid flows from both inlet chambers to the outlet chamber whereupon he fluids are then delivered to the mixing tube.

In the preferred form of the invention, the housing comprises a first and second housing part which are detachably secured together so that the valve outlets are readily accessible for cleaning and to provide a means for taking ratio checks as will become more apparent as the construction and operation of the device is described in greater detail. Furthermore, with the housing part separated, the outlet chamber is also accessible for any necessary cleaning.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a side view illustrating a preferred embodiment of the invention;

FIG. 2 is an exploded view showing the preferred embodiment of the invention;

FIG. 3 is a longitudinal sectional view taken substantially along line 3—3 in FIG. 1 and enlarged for clarity; and FIG. 4 is a cross sectional view taken substantially along line 4—4 in FIG. 1 and enlarged for clarity.

DETAILED DESCRIPTION OF A PREFERRED EMBODIMENT OF THE PRESENT INVENTION

With reference first to FIGS. 1 and 2, the flow gun of the present invention comprises a housing 10 having a first part 12 and a second part 14. The housing parts 12 and 14 are detachably secured together in a manner which will be subsequently described. In addition, the first housing part 12 includes a hand grip 16 to facilitate the manual manipulation of the gun.

With reference now particularly to FIG. 3, a first inlet chamber 18 and second inlet chamber 20 are formed in the first housing part 12. As can best be seen in FIG. 2, a first fluid component 22 is connected by conventional fluid fittings to the first inlet chamber 18 while, similarly, a second fluid component 24 is connected by conventional fluid fittings to the second inlet chamber 20. The fluid components 22 and 24 preferably are delivered to the chambers 18 and 20 in the proper proportions to be chemically reactive by a proportioning means (not shown).

With reference now particularly to FIG. 3, an outlet chamber 26 is formed within the second housing part 14. This outlet chamber 26 is open to an exhaust passageway 28 formed in the second housing part 14. The passageway 28 delivers the first and second components to a static type mixing tube 30 which discharges the chemically reacted material to the point of use. The tube 30 is mounted to the housing part 14 by conventional fluid fitting 32.

With reference still to FIG. 3, a first fluid passageway 34 fluidly connects the first inlet chamber 18 with the outlet chamber 26. Similarly, a second fluid passageway 36 fluidly connects the second inlet chamber 20 with the outlet chamber 26. A bushing 38 having a valve seat 40 is threadably secured to the first housing part 12 within each passageway 34 and 36. A conventional fluid seal 42 is provided between each bushing 38 and the first housing part 12.

Still referring to FIG. 3, a pair of studs 44 are secured to and extend outwardly from one end 46 of the first housing part 12. These studs 44 are slidably received through bores 48 formed in the second housing part 14. Nuts 50 then threadably engage the studs 44 so that, upon tightening, the nuts detachably secure the housing parts 12 and 14 together. Furthermore, the housing parts 12 and 14 abut together along a plane that is open to the outlet chamber 26. Consequently, upon detachment of the housing parts 12 and 14, as shown in FIG. 2, the outlet chamber 26 is open and accessible for any necessary cleaning.

A valve member 52 is positioned within each passageway 34 and 36 and is movable between an open position, shown in phantom line, and a closed position, shown in solid line. In its closed position, each valve member 52 engages its associated valve seat 40 and prevents fluid flow through the passageways 34 and 36. Conversely, with the valve members 52 in their open position, the valve members 52 permit free fluid flow from the inlet chambers 18 and 20 into the outlet chamber 26.

Upon detachment of the nuts 50 and separation of the housing parts 12 and 14, the valves 52 and their associates seats are also exposed and accessible for cleaning.

An elongated rod 54 is secured at one end to each valve member 52. The rods 54 extend through packing assemblies 56 secured to the first housing part 12 so that the other ends 58 of the rods 54 are positioned outside of the housing 10. The other ends 58 of the rods 54 are secured by nuts 60 to a bracket 62. Nuts 57 engage the packing assemblies 56 to permit compensation for wear in a conventional manner.

With reference now particularly to FIGS. 1, 2, and 3, an actuator rod 64 is mounted to the bracket 62. A roller 66 is pivotally secured by a pivot pin 68 to a midpoint of a trigger 70. The end of the rod 64 engages the roller 66. The upper end of the trigger 70 is pivotally secured by a pin 72 (FIG. 1) to the first housing part 12 so that the trigger 70 is movable between the position shown in solid line and phantom line in FIG. 1. With the trigger in the position shown in phantom line, the bracket 62 is also moved rearwardly thus simultaneously retracting both valve members 52 to their open position. The nuts 60 securing the valve rods 54 to the bracket 62 also provide an adjustment to ensure that both valve members 52 simultaneously open and close. A spring 74 between the bracket 62 and a bushing 76 secured to the first housing 12 urges the valve members 52 towards their closed position.

The rolling engagement between the trigger 70 and the actuating rod 64 which is provided by the roller 66 compensates for arcuate movement of the trigger 70 produced by the pivotal connection at 72.

Referring again particularly to FIG. 3, a bleed valve 78 is contained within the bushing 76 and is urged to its closed position by a compression spring 80. The bleed valve 78 is aligned with a rearwardly extending portion 82 of the actuator rod 64, so that, when the valve members 52 are moved to their open position, the actuator rod portion 82 upsets and opens the bleed valve 78 against the force of the compression spring 80.

One side of the bleed valve 78 is open through the bushing 76 to atmospheric pressure while the other side of the valve 78 is connected by a conduit 84 to a source 86 of pressure other than atmospheric pressure. The source 86 can be either positive pressure, i.e., greater than atmospheric pressure, or negative pressure, i.e., a vacuum. Means 88" associated with the pressure source 86 utilize the pressure change produced by the bleed valve 78 to start a clock 88' which will set off an alarm 88 if the gun 10 has been idle too long.

With reference now particularly to FIG. 4, an auxiliary passageway 90 is formed through the second housing part 14 and is connected by a conventional fluid fitting 92, through a shut-off valve 94 and conduit 96 to a pressurized auxiliary fluid source 98, such as solvent. In addition, a one way check valve 100 permits flow of the solvent 98, once the shut-off valve 94 is opened, into the outlet chamber 26 but ordinarily prevents the fluid component from being delivered to the gun 10 during ordinary operation from flowing past the valve 100 into the conduit 96.

In operation, the device of the present invention is particularly suitable for mixing and dispensing two adhesive components. Each source 22 and 24 of the adhesive components are pressurized by the proportioning device (not shown) and the pressurized adhesive components are delivered to the inlet chambers 18 and 22 in the proper proportions to produce the desired chemical reaction. The valve members 52 are simultaneously opened by squeezing the trigger 70 against the hand grip 16 whereupon the adhesive components flow into the outlet chamber 26, are intermixed and flow outwardly through the outlet passage 28 and into the mixing tube 30. The flow of adhesive from the mixing tube can be interrupted at any time by releasing the trigger 70.

The mixing tube 30 has not been described in detail, but it is a conventional type static type mixer which receives the components from the gun 10 in relatively unmixed form and mixes them sufficiently prior to dispensing them from the end so that they have chemically reacted to produce the desired chemical material.

Whenever the valve members 52 are open, the portion 82 of the actuator rod 64 simultaneously upsets or opens the bleed valve 78 which decreases the pressure differential between the pressure source 86 and atmospheric pressure. When the valve members are closed, the pressure differential again increases and this increase can be utilized by means not shown to set a clock so that the length of time the gun 10 has not been used can be readily determined or if desired, to actuate means to put into operation an automatic purging system after the lapse of some predetermined time period. As long as the gun 10 is being used and components are freely flowing through the device, there is little danger of clogging. Clogging will occur, however, if the gun 10 is permitted to sit idle for too long a period of time.

To clean the gun 10, the operator closes both valve members 52 by releasing the trigger 70. The shut-off valve 94 is opened so that solvent flows through the outlet chamber 26 and out through the dispensing tube 30. Alternatively, the housing parts 12 and 14 can be detached from each other and the outlet chamber 26 and its adjacent components and passageways cleaned as required.

An important advantage of the device of the present invention is the detachability of the housing parts 12 and 14 to provide easy access to the outlet side of the valves 52 to permit a ratio check. Proper chemical reaction requires that the fluid components be delivered to the mixing tube 30 in the correct proportions. Previous systems have not included means for checking the proportions of such materials at a point closely adjacent the mixing tube 30.

In the present invention, the housing parts 12 and 14 can be separated, the valves 52 opened and the material passing past the valves 52 collected to perform the ratio check. The check will be accurate because it is performed at a point in the system near the entrance to the mixing tube 30.

Having described my invention, however, many modifications thereto will become apparent to those skilled in the art to which it pertains without deviation from the spirit of the invention as defined by the scope of the appended claims.

I claim:

1. In a system for mixing and dispensing two or more fluids, a flow gun comprising:
    a housing having at least two inlet chambers and an outlet chamber,
    means for fluidly connecting a first fluid to one inlet chamber and a second fluid to the other inlet chamber,
    a first fluid passageway for fluidly connecting said one inlet chamber to said outlet chamber,
    a second fluid passageway for fluidly connecting said other inlet chamber to said outlet chamber,
    an outlet fluid passageway having one end open to said outlet chamber and its other end open exteriorly of said housing,
    valve means movable between an open and a closed position for simultaneously opening and closing said first and second fluid passageways,
    wherein said housing comprises a first part and a second part, said housing parts abutting together along a plane open to said outlet chamber,
    means for detachably securing said housing parts together,
    wherein said outlet chamber is wholly formed in said second housing part,
    wherein said valve means are wholly attached to said first housing part so that, upon detachment of said housing parts and actuation of said valve means, the dispensing ratio of said fluids can be measured.

2. The invention as defined in claim 1 and in which detaching said housing parts exposes the outlet side of said valve means whereby the flow across said valve means can be measured with said housing parts detached.

3. The invention as defined in claim 1 wherein said valve means comprises a valve seat formed in each of said first and second fluid passageways, a valve member which cooperates with each seat, an elongated rod secured at one end to each valve member and its other end extending outwardly from said housing, means attached to said rods for simultaneously moving said valve members toward and away from said valve seats.

4. The invention as defined in claim 1 and comprising spring means between said housing and said valve means for urging said valve means towards said closed position.

5. The invention as defined in claim 1 wherein said detachable securing means comprises at least one threaded stud secured to one of said housing parts, said stud slidably positioned through a bore in the other housing part, and a nut which threadably engages said stud.

6. The invention as defined in claim 1 and comprising an auxiliary passageway formed in said housing, said auxiliary passageway having one end open to said outlet chamber and its other end open exteriorly of said housing, said auxiliary passageway adapted for connection with a further fluid source.

7. The invention as defined in claim 6 and comprising one way valve means operatively disposed in said auxiliary passageway.

* * * * *